Oct. 13, 1942.    F. R. WEST    2,299,046
METHOD OF AND APPARATUS FOR CONDITIONING FRUITS, VEGETABLES, AND THE LIKE
Filed Aug. 3, 1940
Fig.1
Fig.2
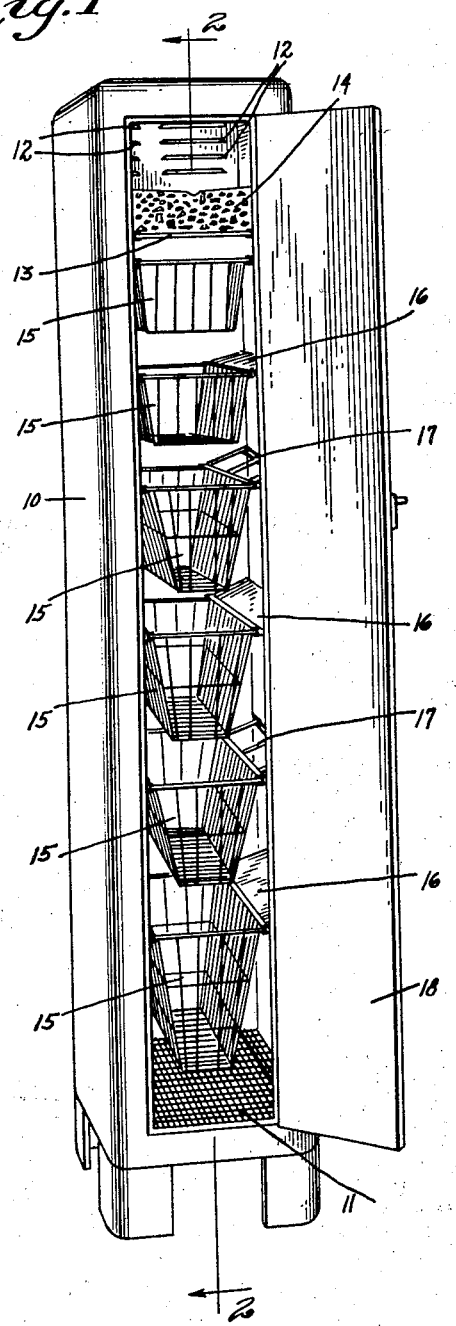
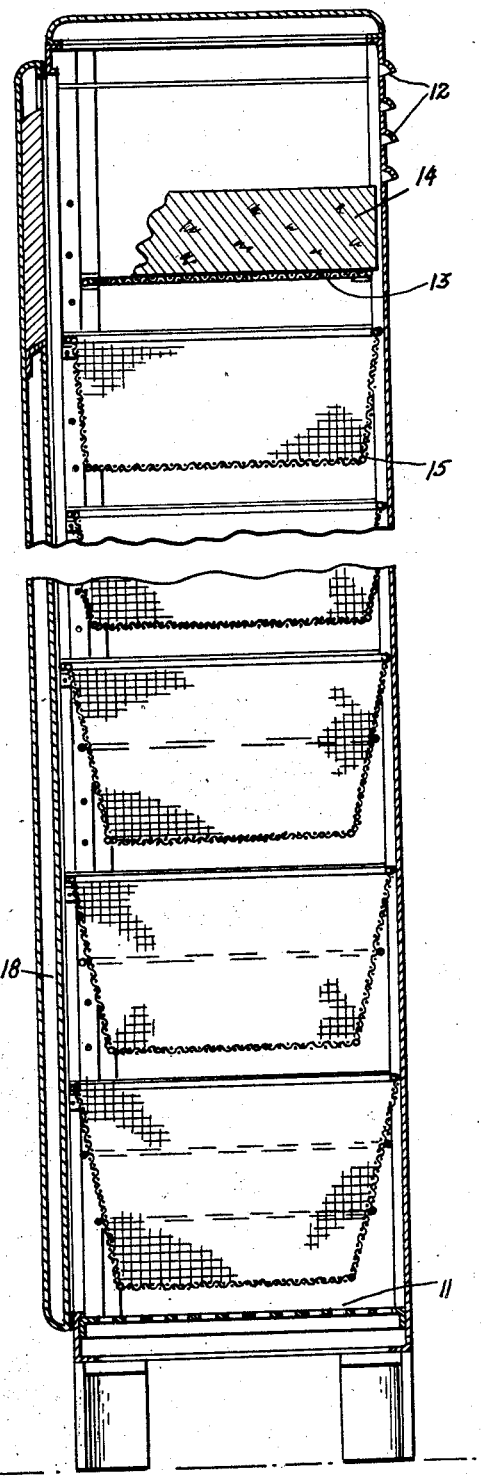
INVENTOR.
Frank R. West
BY Barnes, Kisselle, Laughlin & Raisch
ATTORNEYS Patented Oct. 13, 1942

2,299,046

UNITED STATES PATENT OFFICE 2,299,046

METHOD OF AND APPARATUS FOR CONDITIONING FRUITS, VEGETABLES, AND THE LIKE

Frank R. West, Detroit, Mich.

Application August 3, 1940, Serial No. 350,285

7 Claims. (Cl. 99—154)

This invention relates to a method of and apparatus for conditioning fruits, vegetables, and the like, and has to do more particularly with a method of obtaining a cooling and humidifying effect by means of water evaporation.

Before the advent of domestic refrigeration, much use was made of the evaporation of water to obtain a mild degree of refrigeration. Such prior attempts included the evaporating of water through the use of moistened fabrics, forming the water into drops, etc., and while such prior attempts resulted in some lowering of the temperature within the cabinet, the effect was entirely general and not directed toward the conservation of individual groups of articles to be conditioned and preserved.

It is an object of the present invention to provide a refrigeration unit for fruits, vegetables and the like which may be used in direct conjunction with the standard compression-expansion type of domestic refrigerator. Many of the bulkier raw foods such as oranges, apples, potatoes, celery, onions, eggs and the like, are not properly conserved when stored in the standard mechanical domestic refrigerator. Instead of storing such articles in the basement or in compartments in the bottom of domestic refrigerators, it is one of the objects of the present invention to provide a relatively tall cabinet of small cross section which may be positioned alongside of the domestic refrigerator or most any other point in the kitchen.

Another feature of the present invention has to do with the storage of fruits, vegetables and the like in separate spaced containers, and the creation of a natural positive strong down-draft of air together with evaporation of a regulated amount of moisture in such a manner that the cabinet, particularly the lower portion thereof, is lowered in temperature and the relative humidity raised; the down-draft is continuous and over and around the separate groups of articles. The natural heat developed by the fruits and vegetables is counteracted by the lowering of temperature within the cabinet, all of the vegetables or fruits are constantly and completely aerated and a constant predetermined relative humidity is maintained over a long period of time.

Other features have to do with the cabinet construction which makes possible the above method, including detail features such as the tapered baskets which cooperate with the cabinet construction to provide tortuous continuous passage of air in addition to other structural features which provide for accessibility, strength, etc., as will be more clearly brought out in the specification and claims.

In the drawing:

Fig. 1 is an open door position showing the interior of the cabinet.

Fig. 2 is a vertical section on the lines 2—2 of Fig. 1.

The invention in question, as shown in the drawing, consists of a cabinet 10 which is comparatively high vertically and has a relatively small cross sectional area. The bottom of the cabinet is formed by a screen 11. The top of the cabinet is provided with openings 12 for the entrance of air. Adjacent the top a screen rack 13 is provided to support a sponge 14 which is to be kept saturated with water. Spaced vertically in the cabinet are bins or baskets 15 which are formed in different sizes for convenience. Each of the baskets, however, is tapered from the top to the bottom to facilitate the downward passage of air. The baskets are supported at the sides by members 16 and 17 which are alternately spaced, the members 16 being a flat sheet of material and the members 17 being formed openly as shown in Fig. 1. Each basket is supported at one side by a member 16 and at the other side by a member 17 so that a tortuous vertical passage is formed in the cabinet. The baskets are slidable on the members 16 and 17 to facilitate access to the articles being stored. A door 18 is provided to permit access to the cabinet.

In the operation, the bins 15 are filled with fruits and vegetables to be stored and the sponge 14 is moistened with water. When this water evaporates, a cooling effect will take place on the air at the top of the cabinet and this cooled air will pass downwardly through the tortuous passage and remove any generated heat from the fruits and vegetables and generally moistening and cooling the cabinet and its contents. In actual tests there has been found to be a relatively strong down-draft created within the cabinet. This produces a constant aeration of the fruits and vegetables and maintains a constant humidity condition which conserves the natural moisture.

I claim:

1. A fruit and vegetable storage compartment comprising a tall cabinet of relatively small cross section having air openings at the top and bottom, means for retaining water at the top of said cabinet whereby the water may contact air passing through the cabinet and evaporate, and a plurality of bins supported in said cabinet and vertically spaced therein for receiving fruits and vegetables.

2. A fruit and vegetable storage compartment comprising a tall cabinet of relatively small cross section having air openings at the top and bottom, means for retaining water at the top of said cabinet whereby the water may contact air passing through the cabinet and evaporate, a plurality of bins supported in said cabinet and vertically spaced therein for receiving fruits and vegetables, and means at each side of said bins for supporting the same and alternately arranged to form a tortuous passage through said cabinet from top to bottom.

3. A fruit and vegetable storage compartment comprising a tall cabinet of relatively small cross section having air openings at the top and bottom, means for retaining water at the top of said cabinet whereby the water may contact air passing through the cabinet and evaporate, and a plurality of wire baskets supported in said cabinet and vertically spaced therein for receiving fruits and vegetables.

4. A fruit and vegetable storage compartment comprising a tall cabinet of relatively small cross section having air openings at the top and bottom, sponge means for retaining water at the top of said cabinet whereby the water may contact air passing through the cabinet and evaporate, and a plurality of bins supported in said cabinet and vertically spaced therein for receiving fruits and vegetables.

5. A fruit and vegetable storage compartment comprising a tall cabinet of relatively small cross section having air openings at the top and bottom, means for retaining water at the top of said cabinet whereby the water may contact air passing through the cabinet and evaporate, and a plurality of bins supported in said cabinet and vertically spaced therein for receiving fruits and vegetables, said bins being tapered from the top to the bottom to facilitate the downward passage of air through said cabinet.

6. The method of refrigerating and conditioning fruits, vegetables and the like which comprises confining the articles to be conditioned within a compartment of relatively small cross section compared to its height, positioning a supply of water in a condition to be easily evaporated adjacent the top of said compartment, said compartment serving, because of its shape and the presence of said water, to create a relatively strong down-draft therein, said strong down-draft of air aerating said articles and evaporating the water to lower the temperature and increase the humidity of said air adjacent the bottom of said compartment.

7. The method of cooling and conditioning fruits and vegetables and the like which comprises confining the articles to be conditioned within a tall cabinet of relatively small cross section, providing a tortuous passage vertically through said cabinet around said articles and supplying a source of moisture at the top portion of said cabinet in a condition to be readily evaporated whereby air at the top of said compartment will be cooled by said evaporation and will pass downwardly through said passage to cool and moisten said articles being stored.

FRANK R. WEST.